United States Patent
Whiteford et al.

(10) Patent No.: US 9,990,738 B2
(45) Date of Patent: Jun. 5, 2018

(54) IMAGE PROCESSING METHOD AND APPARATUS FOR DETERMINING DEPTH WITHIN AN IMAGE

(71) Applicant: BAE Systems plc, London (GB)

(72) Inventors: Christopher James Whiteford, Warton (GB); Nicholas Giacomo Robert Colosimo, Warton (GB); Julian David Wright, Warton (GB)

(73) Assignee: BAE Systems plc, London (GB)

( * ) Notice: Subject to any disclaimer, the term of this patent is extended or adjusted under 35 U.S.C. 154(b) by 0 days. days.

(21) Appl. No.: 15/550,975

(22) PCT Filed: Feb. 16, 2016

(86) PCT No.: PCT/GB2016/050376
§ 371 (c)(1),
(2) Date: Aug. 14, 2017

(87) PCT Pub. No.: WO2016/135451
PCT Pub. Date: Sep. 1, 2016

(65) Prior Publication Data
US 2018/0033157 A1    Feb. 1, 2018

(30) Foreign Application Priority Data
Feb. 25, 2015 (EP) ..................... 15275044
Feb. 25, 2015 (GB) ..................... 1503108.1

(51) Int. Cl.
*G06T 15/00* (2011.01)
*G06T 7/557* (2017.01)
(Continued)

(52) U.S. Cl.
CPC ............... *G06T 7/557* (2017.01); *G06T 7/12* (2017.01); *G06T 7/13* (2017.01); *G06T 7/571* (2017.01);
(Continued)

(58) Field of Classification Search
CPC ..... G06T 7/37; G06T 5/50; G06T 7/11; G06T 7/571; G06T 2207/10016;
(Continued)

(56) References Cited

U.S. PATENT DOCUMENTS 8,184,196 B2 * 5/2012 Forutanpour ........... G06T 7/571
348/239
8,493,432 B2 * 7/2013 Taguchi ............. H04N 5/23238
348/36

(Continued)

FOREIGN PATENT DOCUMENTS

DE    102004006246 A1    10/2005
EP    2239706 A1    10/2010

OTHER PUBLICATIONS

Aggarwal, Manoj, and Narendra Ahuja. "Split aperture imaging for high dynamic range." International Journal of Computer Vision 58, No. 1 (2004): 7-17.*

(Continued)

*Primary Examiner* — Phu K Nguyen
(74) *Attorney, Agent, or Firm* — Maine Cernota & Rardin

(57) ABSTRACT

An image processing method and apparatus for determining depth in an original image captured by a light field image capture device, in which a light field analysis algorithm is applied a plurality of times to the original image, changing the focus setting each time, so as to generate a respective plurality of scene images focused at different depths; edge detection is performed in respect of each of the scene images to generate a respective plurality of edge detected images; area identification is performed in respect of each edge detected image to generate a respective plurality of area identification images indicative of areas of respective edge detected images in which edges have been detected; and the area identification images are applied to respective scene (Continued)

images so as to extract from the scene images respective image segments corresponding to the areas in which edges have been detected.

10 Claims, 3 Drawing Sheets

(51) Int. Cl.
  *G06T 7/13* (2017.01)
  *G06T 7/12* (2017.01)
  *G06T 19/00* (2011.01)
  *G06T 7/571* (2017.01)

(52) U.S. Cl.
  CPC .. *G06T 19/006* (2013.01); *G06T 2207/10052* (2013.01); *G06T 2207/10148* (2013.01)

(58) Field of Classification Search
  CPC ........... G06T 2207/10148; G06T 2207/20221; H04N 5/23212
  USPC ................................. 345/518, 418
  See application file for complete search history.

(56) References Cited

U.S. PATENT DOCUMENTS

| | | | |
|---|---|---|---|
| 8,570,426 B2 * | 10/2013 | Pitts | H04N 5/23212 348/345 |
| 9,432,563 B2 * | 8/2016 | Blayvas | H04N 5/232 |
| 9,707,892 B2 * | 7/2017 | Foley | B60R 1/002 |
| 2010/0033617 A1 | 2/2010 | Forutanpour | |
| 2010/0128145 A1 | 5/2010 | Pitts et al. | |
| 2011/0316968 A1 | 12/2011 | Taguchi et al. | |
| 2014/0043435 A1 | 2/2014 | Blayvas | |

OTHER PUBLICATIONS

Levin, Anat, et al. "Image and depth from a conventional camera with a coded aperture." ACM transactions on graphics (TOG) 26.3 (2007): 70.*
Green, P., Sun, W., Matusik, W. and Durand, F., 2007, August. Multi-aperture photography. In ACM Transactions on Graphics (TOG) (vol. 26, No. 3, p. 68). ACM.*
PCT International Search Report and Written Opinion for Appl No. PCT/GB2016/050376 dated Apr. 5, 2016, 10 pages.
Hiura S et al: "Depth measurement by the multi-focus camera", Computer Vision and Pattern Recognition, 1998. Proceedings. 1998 IEEE Computer Society Conference on Santa Barbara, CA, USA Jun. 23-25, 1998, Los Alamitos, CA, USA, IEEE Cumputer Society, US, Jun. 23, 1998, pp. 953-959, 3.1 Blurring Characteristics in the Spatio-Focal Image; p. 954-p. 955, figure 2.
Subbarao M et al: "Depth recovery from blurred edges", Proceedings of the Conference on Computer Visions and Pattern Recognition, Ann Arbor, Jun. 5-9, 1988; [Proceedings of the Conference on Computer Vision and Pattern Recognition], Washington, IEEE Computer Society Press, US, vol. -, Jun. 5, 1988 (Jun. 5, 1988), pp. 498-503.
Alex Paul Pentland: "A New Sense for Depth of Field", IEEE Transactions on Pattern Analysis and Machine Intelligence, IEEE Computer Society, USA, vol. 30, No. 4, Jul. 1, 1987, pp. 523-531.
Tao Michael W et al: "Depth from Combining Defocus and Correspondence Using Light-Field Cameras", 2013 IEEE International Conference on Computer Vision, IEEE, Dec. 1, 2013, pp. 673-680.
Mohamed Amtoub: "Depth recovery using a plenoptic camera", Electronics These and Dissertations, paper 1643, http://scholar.uwindsor.ca/etd/1643, Apr. 1, 2003, pp. 1-79.
European Extended Search Report for Appl No. 15275044.4 dated Sep. 10, 2015, 9 pages.
Great Britain Search Report for Appl No. GB1503108.1 dated Jul. 31, 2015, 5 pages.
International Preliminary Report on Patentability of International Application PCT/GB2016/050376, dated Aug. 29, 2017, 9 pages.

* cited by examiner

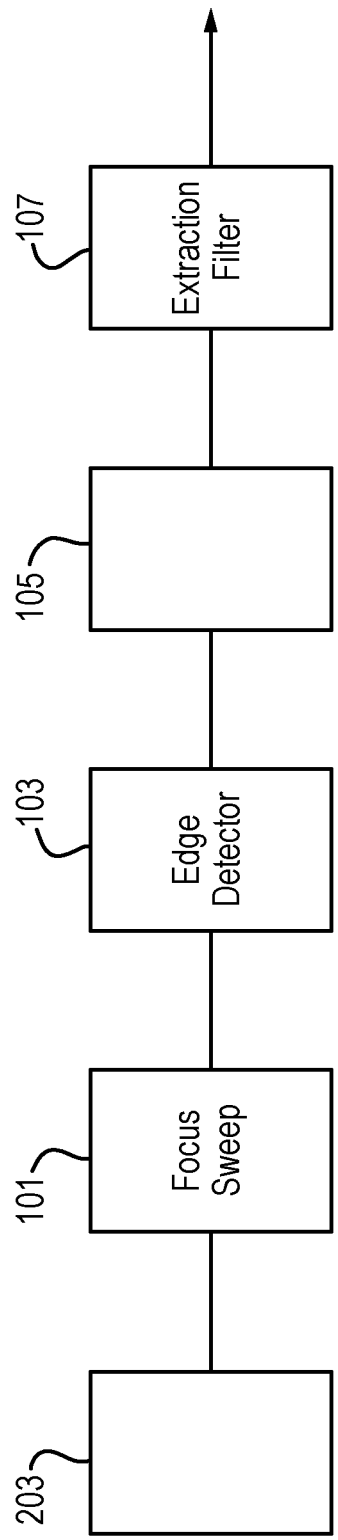

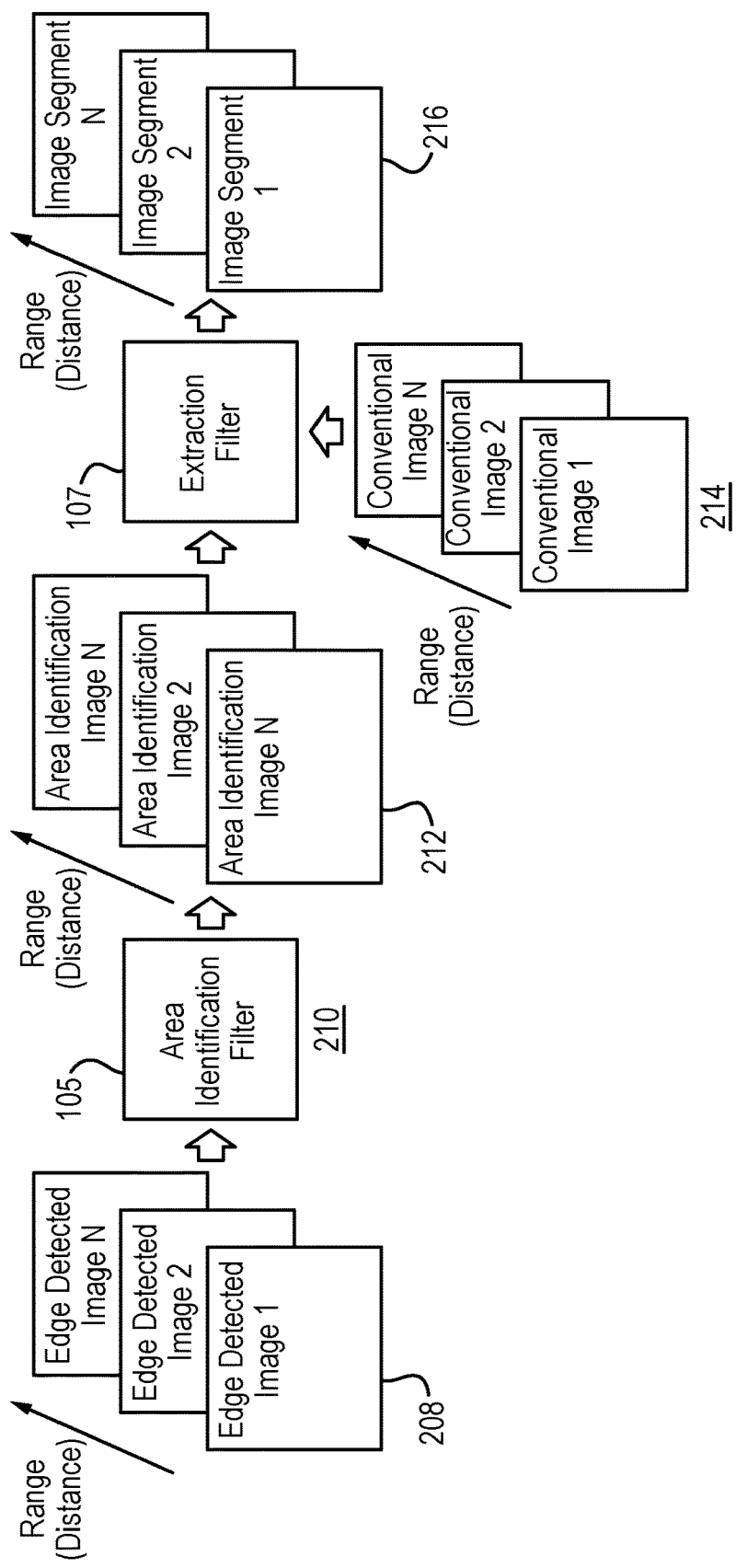

IMAGE PROCESSING METHOD AND APPARATUS FOR DETERMINING DEPTH WITHIN AN IMAGE

RELATED APPLICATIONS

This application is a national phase application filed under 35 USC § 371 of PCT Application No. PCT/GB2016/050376 with an International filing date of Feb. 16, 2016, which claims priority of GB Patent Application 1503108.1 filed Feb. 25, 2015 and EP Patent Application 15275044.4 filed Feb. 25, 2015. Each of these applications is herein incorporated by reference in its entirety for all purposes.

FIELD OF THE INVENTION

This invention relates generally to an image processing method and apparatus for determining depth within an image and, more particularly, to a method and apparatus for processing an image to provide data that enables effective depth comparison within a three dimensional scene or image.

BACKGROUND OF THE INVENTION

Virtual reality systems are known, comprising a headset which, when placed over a user's eyes, creates and displays a three dimensional virtual environment in which a user feels immersed and with which the user can interact in a manner dependent on the application. For example, the virtual environment created may comprise a game zone, within which a user can play a game.

More recently, mixed reality systems have been developed, in which an image of a real world object can be captured, rendered and placed within a 3D virtual reality environment, such that it can be viewed and manipulated within that environment in the same way as virtual objects therein. Other mixed reality systems have also been developed that enable virtual images to be blended into a user's view of the real world. In order to make such systems effective, the blended images and the environment scene must be combined seamlessly so that an object aligns correctly with the scene into which it is being placed. Realistic merging of virtual and real objects into a scene also requires that the position and movement of objects is realistic, and that they behave in a physically plausible manner within the environment. Thus, for example, they may need to be occluded or shadowed by objects in the scene.

Theoretically, resolving occlusions amounts to a comparison of the depth of captured and virtual objects with the depth of the scene into which they are to be placed, and systems have been developed that employ 3D mapping and 3D reconstruction to resolve this issue. However, there are a number of problems associated with these known techniques. Firstly, the processing and hardware overhead for 3D reconstruction techniques is relatively high. Also, whatever method is used for 3D reconstruction, the accuracy or density of the recovered map is often not sufficient to produce a good estimate of the occluding boundaries, especially for complex scenes. Still further, camera motion between two frames is not always perfectly known in real augmented reality applications.

It would, therefore, be desirable to provide a passive approach to the depth comparison in mixed and augmented reality systems, and aspects of the present invention are intended to address at least some of these issues.

SUMMARY OF THE INVENTION

Thus, in accordance with a first aspect of the present invention, there is provided an image processing method for determining depth in an original image captured by a light field image capture device, the method comprising:
applying a light field analysis algorithm a plurality of times to said original image, changing the focus setting each time, so as to generate a respective plurality of scene images focused at different depths;
performing edge detection in respect of each of said scene images to generate a respective plurality of edge detected images;
performing area identification in respect of each edge detected image to generate a respective plurality of area identification images indicative of areas of respective edge detected images in which edges have been detected; and
applying said area identification images to respective scene images so as to extract from said scene images respective image segments corresponding to said areas in which edges have been detected.

Thus, the above-mentioned plurality of scene images may be generated by applying a different respective focus setting to said original image and storing the image thus generated. The focus setting may first be set to a shortest depth to generate a first scene image and then stepped at intervals to infinity to generate the remaining scene images. In this case, the intervals between focus settings may be substantially equal.

Each scene image may be stored in association with data representative of a respective focus setting.

Each of the edge detected images may comprise one or more curved line segments representative of one or more respective features of the original image determined to be in focus at a corresponding respective depth value. Each edge detected image may be stored in association with data representative of said respective depth value.

Each image segment may be stored in association with data representative of a corresponding respective depth value.

The image segments may be stored in the form of a virtual stack in an order representative of the depth values associated therewith.

Another aspect of the present invention may provide an image processing apparatus for determining depth in an original image captured by a light field image capture device, the apparatus comprising:
an analysis module configured to apply a light field analysis algorithm a plurality of times to said original image, changing the focus setting each time, so as to generate a respective plurality of scene images focused at different depths;
an edge detection module configured to perform edge detection in respect of each of said scene images to generate a respective plurality of edge detected images;
an area identification module configured to perform area identification in respect of each edge detected image to generate a respective plurality of area identification images indicative of areas of respective edge detected images in which edges have been detected;
an extraction module configured to apply said area identification images to respective scene images so as to extract from said scene images respective image segments corresponding to said areas in which edges have been detected; and a storage module for storing said plurality of image segments in association with data representative of the respective depth values to which they correspond.

The said plurality of scene images may be generated by applying a different respective focus setting to said original image and storing the image thus generated. The focus setting may be first set to a shortest depth to generate a first scene image and then may be stepped at intervals to infinity to generate the remaining scene images.

In accordance yet another aspect of the present invention, there is provided a mixed or augmented reality system comprising a screen and a processor configured to generate and display on said screen a three dimensional scene, the processor including an image processing module for receiving an image captured by a light field camera to be inserted into said three dimensional scene, said image processing module including apparatus as described above for generating a plurality of image segments derived from an image representative of said three dimensional scene together with data representative of their respective distance from the light field camera, and an image insertion module for receiving or generating data representative of a selected depth value within said scene at which said image is to be inserted, identifying two image segments corresponding to respective depth values either side of said selected depth value, and inserting said image between said two image segments.

BRIEF DESCRIPTION OF THE DRAWINGS

These and other aspects of the present invention will be apparent from the following specific description in which embodiments of the present invention are described in detail, by way of examples only, and with reference to the accompanying drawings, in which:

FIG. 1 is a schematic block diagram of a distance determination apparatus according to an exemplary embodiment of the present invention; and FIGS. 2A and 2B are schematic flow diagrams illustrating a method, according to an exemplary embodiment of the present invention, for determining depth in an image.

DETAILED DESCRIPTION

Figure 2A:
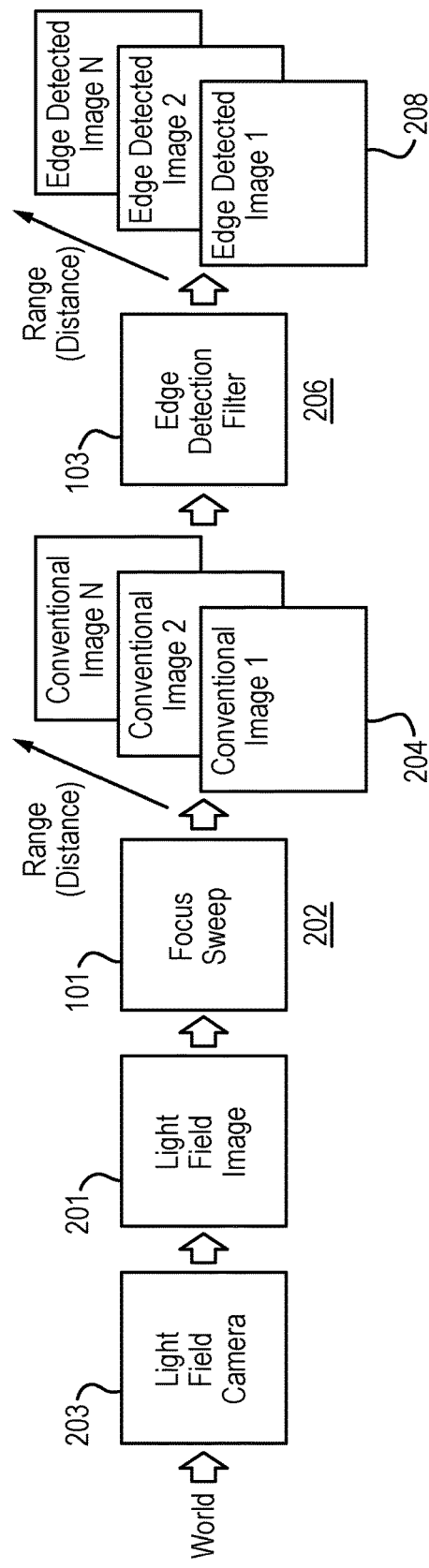

Referring to FIG. 1 of the drawings, a depth determination apparatus according to an exemplary embodiment of the present invention comprises a light field camera 203, a focus sweep function 101, and edge detection module 103, an area identification filter 105 and an extraction filter 107.

Referring additionally to FIG. 2A of the drawings, at step 200 of an exemplary method according to the invention, an image 201 of a scene is captured using the light field camera 203. A light field camera is a type of camera that uses a microlens array to capture 4D light field information about a scene, so as to enable digital plenoptic images to be captured that can be refocused after they are taken. Each microlens measures not just the total amount of light captured at that location, but also how much light arrives along each ray, such that, by using this information, a number of images can be generated which are focused at different depths (within the captured scene). Thus, a light field analysis algorithm can be employed in respect of a light field image of a scene to generate a number of 'conventional' images, each focused at a different depth, simply by changing the focus setting for each respective application of the algorithm, wherein the focus setting is directly related to, and corresponds, to the distance between the camera and the object(s) in the field of view.

Accordingly, at step 202, and in accordance with an exemplary embodiment of the present invention, a light field analysis algorithm is thus applied, a number of times, to a light field image of a scene, changing the focus setting each time, starting with the shortest distance value possible and stepped at regular intervals to infinity.

The result of step 202 is a stack of conventional images 204 where each image differs by what is and is not in focus. Elements that are in focus correspond to a particular distance value (i.e. distance between the camera and the elements that are in focus), leaving all other range values (i.e. elements at a different distance from the camera) out of focus.

At step 206, each of the conventional images is applied to an edge detection filter 103. Edge detection in images is known, and is simply the name given to a set of mathematical methods which aim at identifying a set of points in a digital image at which the image brightness changes sharply or, more formally, has discontinuities. The points at which image brightness changes sharply are organised into a set of curved line segments termed 'edges'. Many ways of performing edge detection will be known to a person skilled in the art, including Canny edge detection, thresholding and linking, edge thinning, second-order approaches such as differential edge detection, and phase congruency-based edge detection, and the present invention is not necessarily intended to be in any way limited in this regard. However, it will be apparent to a person skilled in the art that, in view of the nature of the conventional images being analysed in this case, regions of each image that are in focus will result in clear edges being produced and regions of each image that are out of focus will not result in any clear edges being detected. Thus, the edge detection process can be relatively straightforward and results in a stack of images 208, each showing detected edges for regions in focus (represented by a curved line segment or 'outline' generated by the edge detection process), wherein each of these images corresponds to the distance between the camera and the region in focus.

Referring now to FIG. 2B of the drawings, at step 210, an area identification filter 105 is applied to the stack 208 of edge detected images so as to generate a stack of area detection images 212. The area detection images 212 are effectively 'masks' which represent and define the region of the original conventional image in which in-focus elements have been identified during the edge detection process.

At step 214, each one of the masks 212 is applied to a corresponding one of the original conventional images 204 to identify and extract, in each case, an image segment or region thereof which contains the in-focus elements therein, and the result is a stack of image segments 216, each containing in-focus elements and corresponding to a respective distance value. It will be appreciated that this image segment stack 216 effectively describes the scene depth and range by reference to what elements thereof are in focus at each of a stepped set of known focus settings.

It will be further appreciated that the determination and description of range (i.e. depth in terms of distance from the camera) is a passive sensing approach to automatic depth determination, and is covert. Furthermore, a conventional stereoscopic camera system determines the depth of an image by identifying common elements of two images taken from spatially separated cameras. The distance between the cameras increases the angular sensitivity of the image and thus the amount of depth resolution (for example, the further apart they are, the greater will be the depth detail). In contrast, with reference to aspects of the present invention, this is avoided by using a single camera with many lenses, and the level of detail could, for example, be increased by using a mechanically adjusted primary lens prior to the lens array. This could allow fine adjustments to the array globally and, thus, allow a huge increase in depth detail whilst maintaining the ability to observe many depth "segments" simultaneously. The primary lens in practice would be seen to be always moving in and out, but this would, in accordance with aspects of the invention, by correlated to the images.

The above-described process can be performed in respect of a scene, as described above, but it may also be performed in respect of an object captured from an angle relative to the horizontal plane, such that three-dimensional angular depth thereof can be described and defined in terms of an image segment stack representative of the angular depth of the image. Thus, as an example, consider a cup located on a table in the real world. An image thereof may be captured, using a light field camera, wherein the camera is pointed toward the cup but looking down from a shallow inclination angle from the horizontal plane. During the focus sweep process, a number of 'conventional' images may be generated, for example: a first image in which everything is blurred (i.e. all out of focus), a second image in which the front/nearest portion of the cup is in focus but the rest is out of focus, a third image in which the sides are in focus and the rest is blurred, a fourth image in which the back is in focus but the rest is blurred, and a final image in which the everything is blurred again. The above-described process can then be used to generate a stack of image segments, each representative of a portion of the cup in focus, corresponding to different respective distance values as before, which will be additionally dependent on the angle of image capture.

A proposed use for the method described above is that of addressing object occlusion when combining virtual objects with real world objects or scenes, as required in augmented and mixed reality systems, and as outlined generally above. It will be appreciated by a person skilled in the art that, once the range of the image or scene has been defined and described in terms of an image segment stack of the type described above, there are a number of ways in which this information may be applied in order to effect the insertion of images and objects into a scene effectively. One such method comprises determining the distance or range at which the object or image is required to appear within the augmented or mixed reality image (by reference to its virtual 'distance' from the camera), identifying the two image segments corresponding to respective locations either side of the required range, inserting the new image between the two corresponding images and then adding all of the images together to re-form a complete image including the new image data.

It will be apparent to a person skilled in the art, from the foregoing description, that modifications and variations can be made to the described embodiments, without departing from the scope of the invention as claimed.

What is claimed is:

1. An image processing method for determining depth in an original digital plenoptic image captured by a light field image capture device, the method comprising:
   applying a light field analysis algorithm a plurality of times to said original digital plenoptic image, changing the focus setting each time, so as to generate a respective plurality of scene images focused at different depths;
   performing edge detection in respect of each of said scene images to generate a respective plurality of edge detected images;
   performing area identification in respect of each edge detected image to generate a respective plurality of area identification images indicative of areas of respective edge detected images in which edges have been detected; and
   applying said area identification images to respective scene images so as to extract from said scene images respective image segments corresponding to said areas in which edges have been detected;
   wherein said plurality of scene images is generated by applying a different respective focus setting to said original digital plenoptic image and storing the image thus generated, wherein the focus setting is first set to a starting depth to generate a first scene image and then stepped at intervals to generate the remaining scene images, and wherein each image segment is stored in association with data representative of a corresponding respective depth value.

2. The method according to claim 1, wherein said intervals between focus settings are substantially equal.

3. The method according to claim 1, wherein each scene image is stored in association with data representative of a respective focus setting.

4. The method according to claim 1, wherein each said edge detected image comprises one or more curved line segments representative of one or more respective features of said original digital plenoptic image determined to be in focus at a corresponding respective depth value.

5. The method according to claim 4, wherein each edge detected image is stored in association with data representative of said respective depth value.

6. The method according to claim 1, wherein the image segments are stored in the form of a virtual stack in an order representative of the depth values associated therewith.

7. The method of claim 1 further comprising receiving or generating data representative of a selected depth value at which an image is to be inserted, identifying two image segments corresponding to respective depth values either side of said selected depth value, and inserting said image between said two image segments.

8. An image processing apparatus for determining depth in an original digital plenoptic image captured by a light field image capture device, the apparatus comprising:
   an analysis module configured to apply a light field analysis algorithm a plurality of times to said original digital plenoptic image, changing the focus setting each time, so as to generate a respective plurality of scene images focused at different depths;
   an edge detection module configured to perform edge detection in respect of each of said scene images to generate a respective plurality of edge detected images;
   an area identification module configured to perform area identification in respect of each edge detected image to generate a respective plurality of area identification images indicative of areas of respective edge detected images in which edges have been detected;
   an extraction module configured to apply said area identification images to respective scene images so as to extract from said scene images respective image segments corresponding to said areas in which edges have been detected; and
   a storage module for storing said plurality of image segments in association with data representative of the respective depth values to which they correspond;
   wherein the focus setting is first set to a shortest depth to generate a first scene image and then stepped at intervals to infinity to generate the remaining scene images.

9. The image processing apparatus as claimed in claim 8, wherein said plurality of scene images is generated by applying a different respective focus setting to said original digital plenoptic image and storing the image thus generated.

10. A mixed or augmented reality system comprising a screen and a processor configured to generate and display on said screen a three dimensional scene, the processor including an image processing module for receiving a digital plenoptic image captured by a light field camera to be inserted into said three dimensional scene, said image processing module including apparatus according to claim 8 for generating a plurality of image segments derived from an image representative of said three dimensional scene together with data representative of their respective distance from the light field camera, and an image insertion module for receiving or generating data representative of a selected depth value within said scene at which said image is to be inserted, identifying two image segments corresponding to respective depth values either side of said selected depth value, and inserting said image between said two image segments.

* * * * *